United States Patent
Yarbrough et al.

(10) Patent No.: US 8,834,117 B2
(45) Date of Patent: Sep. 16, 2014

(54) INTEGRATED LIGHTNING RECEPTOR SYSTEM AND TRAILING EDGE NOISE REDUCER FOR A WIND TURBINE ROTOR BLADE

(75) Inventors: Aaron Yarbrough, Clemson, SC (US); Yaru Najem Mendez Hernandez, Munich (DE); Theodosia Kourkoutsaki, Munich (DE); Biju Nanukuttan, Jabalpur (IN); Matthew G. Gann, Greenville, SC (US); Richard Hardison, Greenville, SC (US); Scott Gabell Riddell, Greer, SC (US); Christopher Daniel Caruso, Minden, NV (US); Wendy Wen-Ling Lin, Niskayuna, NY (US); Jamie Livingston, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 487 days.

(21) Appl. No.: 13/228,565

(22) Filed: Sep. 9, 2011

(65) Prior Publication Data
US 2012/0141277 A1 Jun. 7, 2012

(51) Int. Cl.
*F03D 11/00* (2006.01)
(52) U.S. Cl.
CPC ........... *F03D 11/0033* (2013.01); *Y02E 10/722* (2013.01); *Y02E 10/721* (2013.01); *F05B 2260/96* (2013.01)
USPC .................................. 416/146 R; 416/229 R
(58) Field of Classification Search
USPC ...... 416/146 R, 228, 229 R, 230, 235, 236 R, 416/241 R
See application file for complete search history.

(56) References Cited

U.S. PATENT DOCUMENTS

| | | | |
|---|---|---|---|
| 5,088,665 A | 2/1992 | Vijgen et al. | |
| 5,533,865 A | 7/1996 | Dassen et al. | |
| 6,729,846 B1 | 5/2004 | Wobben | |
| 6,830,436 B2 | 12/2004 | Shibata et al. | |
| 7,059,833 B2 | 6/2006 | Stiesdal et al. | |
| 7,637,721 B2 | 12/2009 | Driver et al. | |
| 8,342,805 B2 * | 1/2013 | Mendez Hernandez et al. | 416/146 R |
| 2007/0065290 A1 | 3/2007 | Herr | |
| 2007/0077150 A1 | 4/2007 | Llorente Gonzalez | |
| 2008/0061192 A1 | 3/2008 | Sullivan | |
| 2008/0080977 A1 | 4/2008 | Bonnet | |
| 2008/0160248 A1 * | 7/2008 | Jacobsen et al. | 428/113 |
| 2008/0166241 A1 | 7/2008 | Herr et al. | |
| 2008/0187442 A1 | 8/2008 | Standish et al. | |
| 2008/0286110 A1 | 11/2008 | Gupta et al. | |

(Continued)

FOREIGN PATENT DOCUMENTS

| | | |
|---|---|---|
| EP | 2 028 366 A2 | 2/2009 |
| EP | 2 053 240 A1 | 4/2009 |

(Continued)

*Primary Examiner* — Liam McDowell
(74) *Attorney, Agent, or Firm* — Dority & Manning, P.A.

(57) ABSTRACT

A rotor blade assembly for a wind turbine includes a rotor blade having a pressure side member, a suction side member, a leading edge, and a trailing edge extending between a tip and a root. An electrically conductive band extends longitudinally on either or both of the pressure side member and suction side member along the trailing edge. A plurality of electrically conductive noise reduction features extend from the trailing edge and are configured as individual lightning strike receptors. The noise reduction features are configured in conductive communication with the conductive band.

17 Claims, 5 Drawing Sheets

(56) References Cited

U.S. PATENT DOCUMENTS

| | | |
|---|---|---|
| 2009/0016891 A1 | 1/2009 | Parsania et al. |
| 2009/0074585 A1 | 3/2009 | Koegler et al. |
| 2009/0104038 A1* | 4/2009 | Grabau .................... 416/219 R |
| 2010/0047070 A1* | 2/2010 | Slot et al. .................. 416/146 R |
| 2013/0034447 A1* | 2/2013 | Nordin et al. ................ 416/230 |
| 2013/0272892 A1* | 10/2013 | Liu .............................. 416/225 |

FOREIGN PATENT DOCUMENTS

| | | |
|---|---|---|
| JP | 2000-120524 | 4/2000 |
| JP | 2003-254225 | 9/2003 |
| WO | WO 2008/035149 A2 | 3/2008 |
| WO | WO 2008/113349 A2 | 9/2008 |
| WO | WO 2009/025549 A1 | 2/2009 |

* cited by examiner

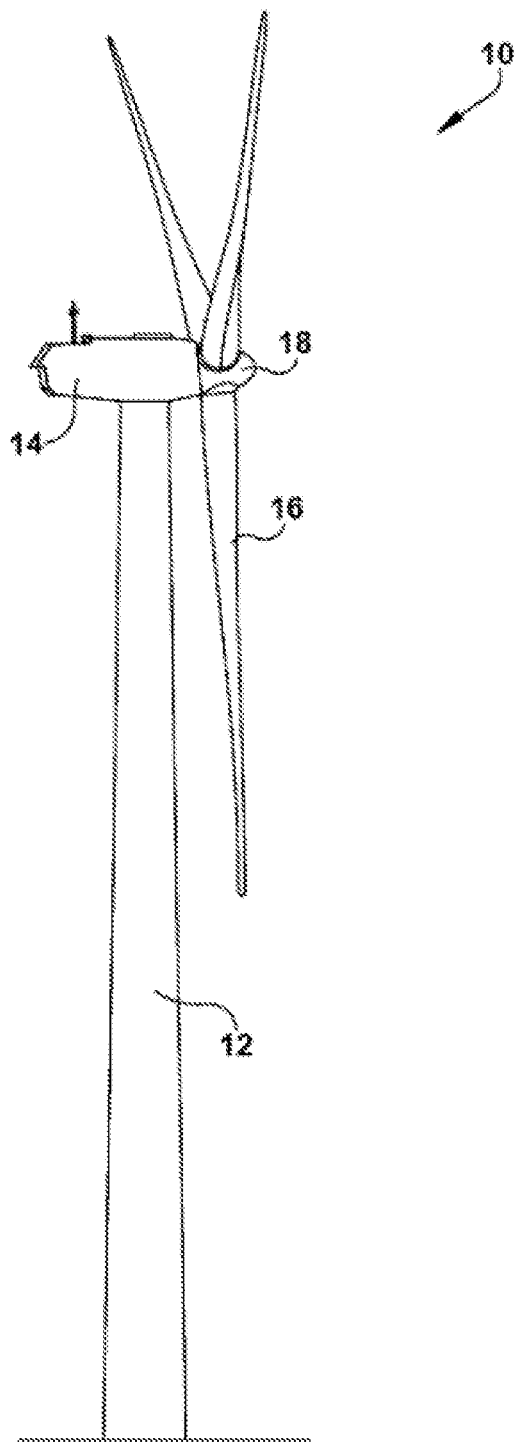
**FIG. -1-
Prior Art**

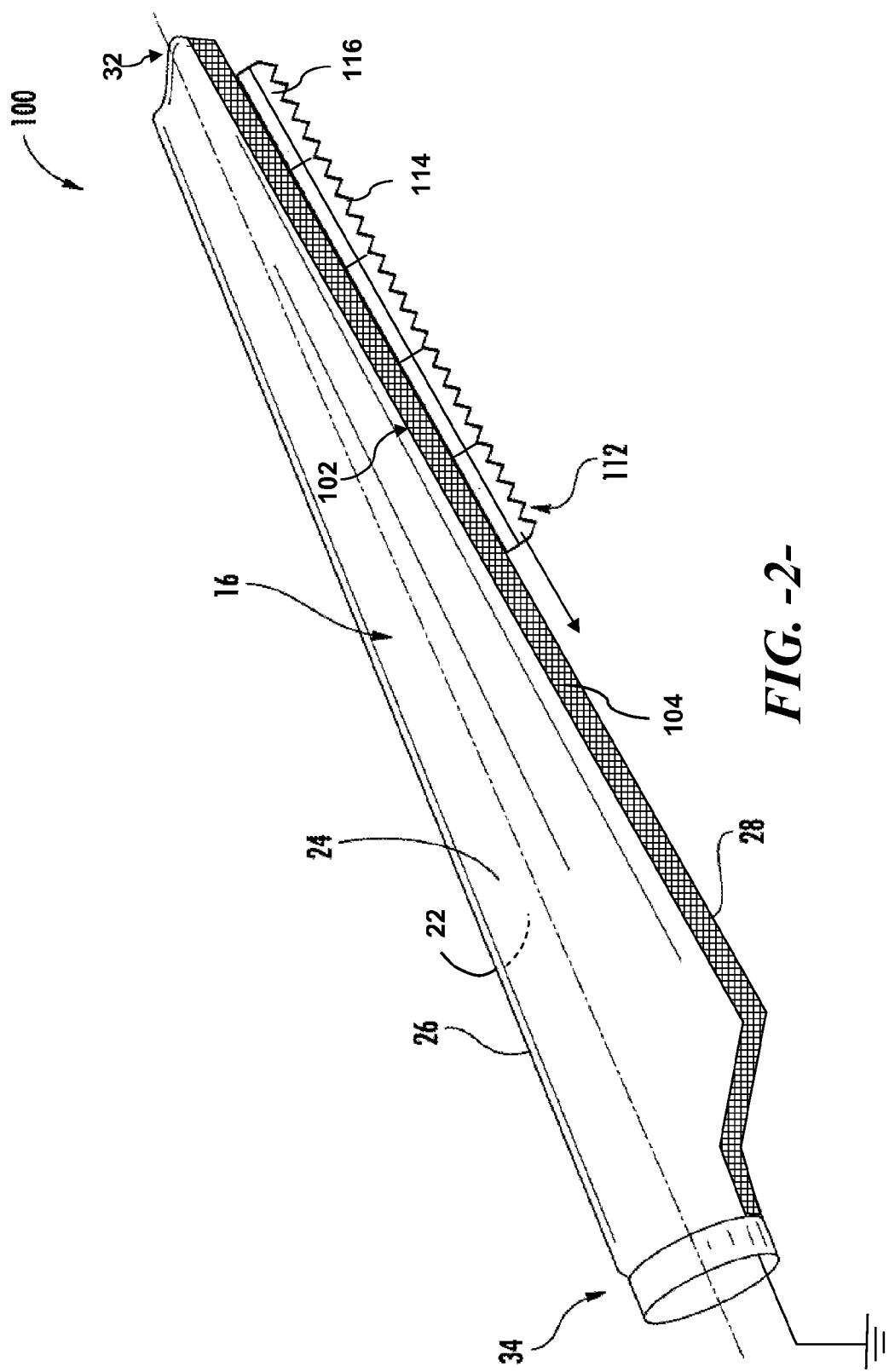
FIG. -2-

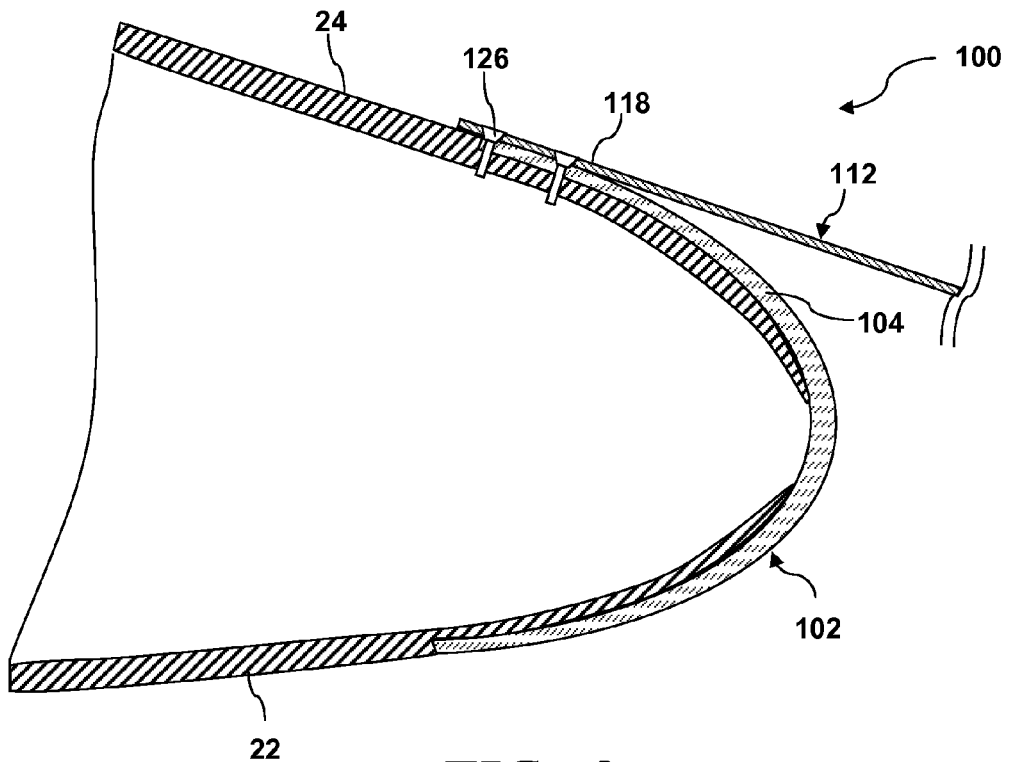
*FIG. -3-*
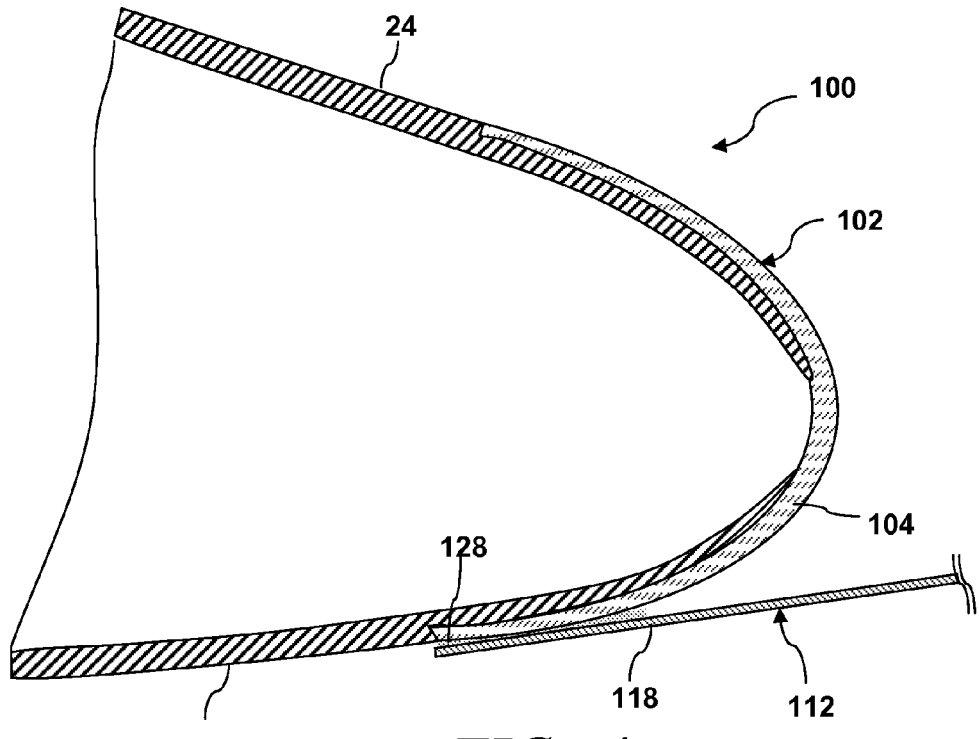
*FIG. -4-*

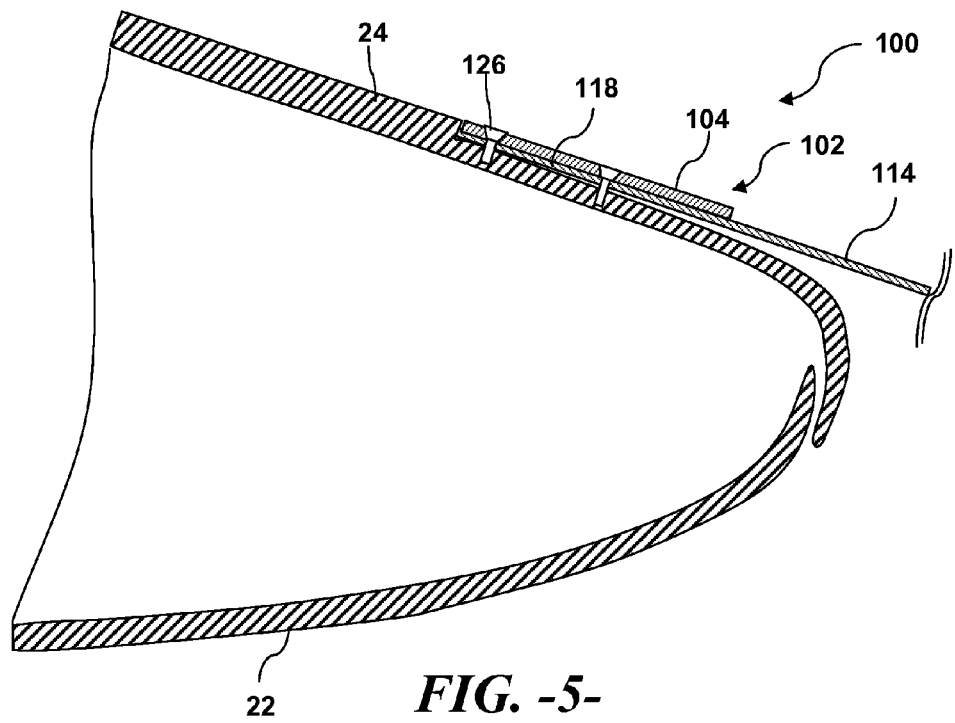
*FIG. -5-*
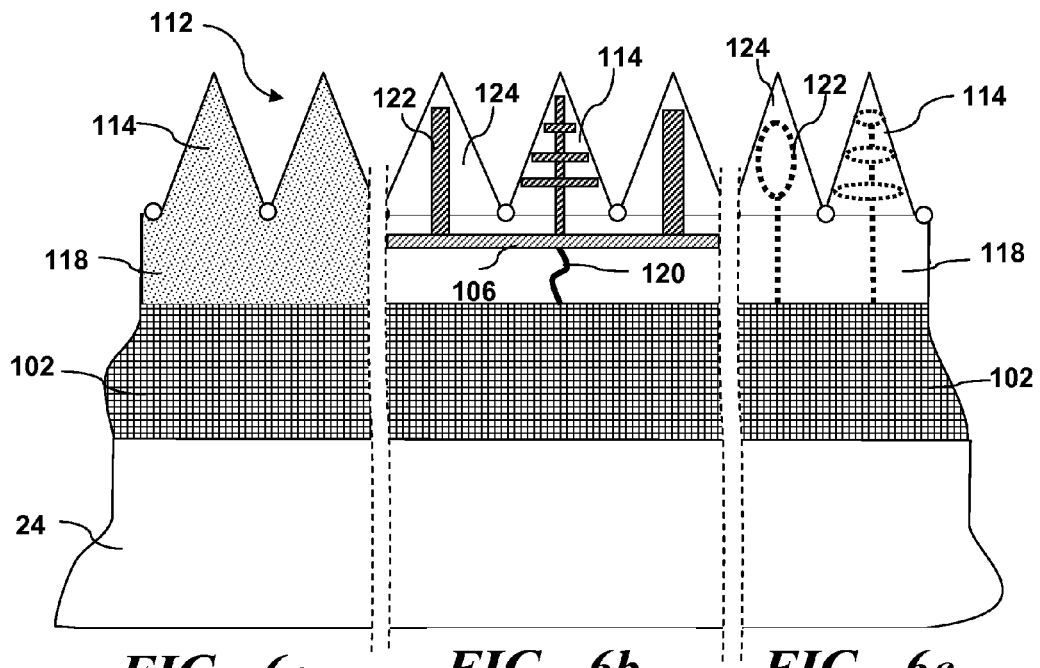
*FIG. -6a-*     *FIG. -6b-*     *FIG. -6c-*

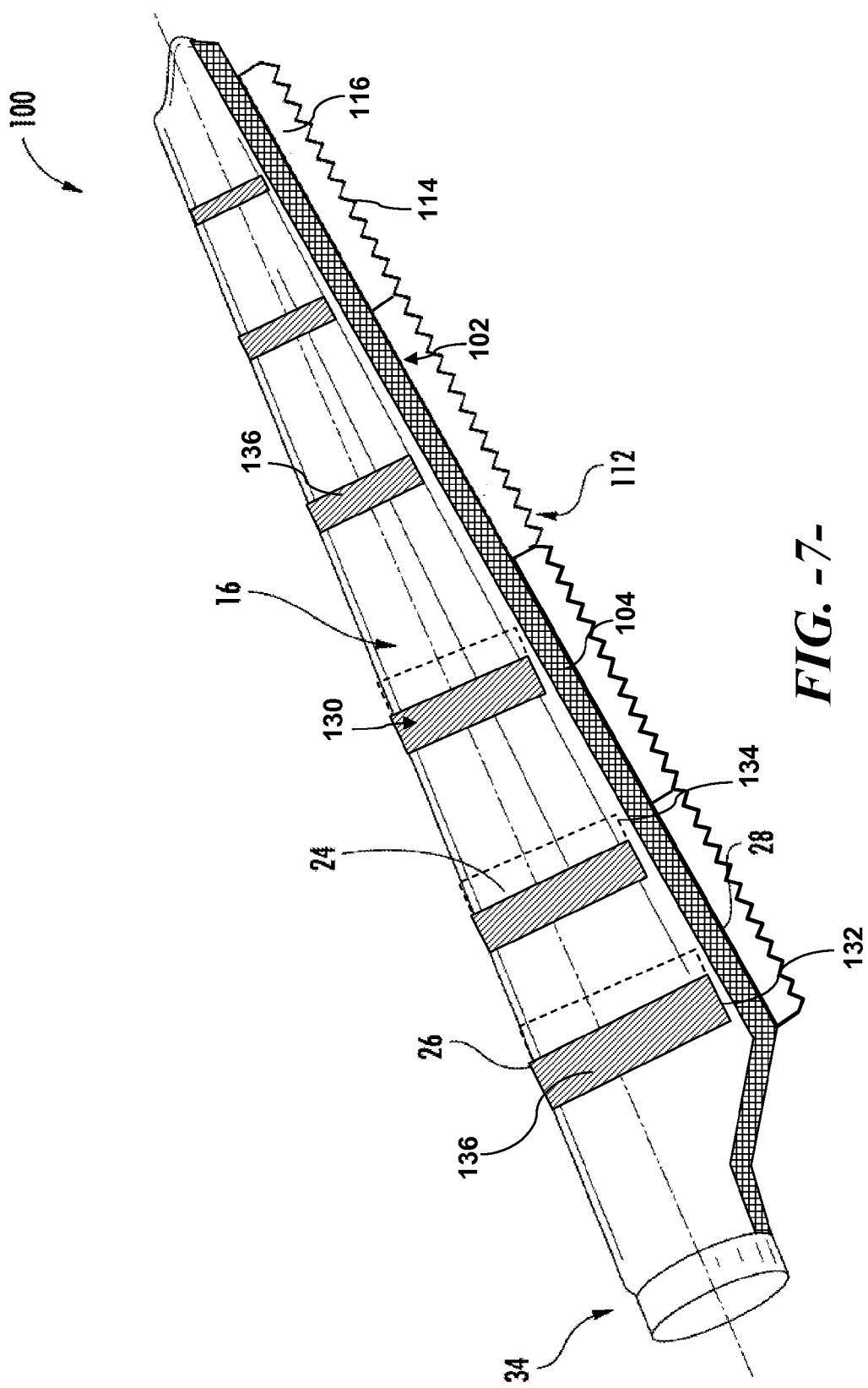

INTEGRATED LIGHTNING RECEPTOR SYSTEM AND TRAILING EDGE NOISE REDUCER FOR A WIND TURBINE ROTOR BLADE

FIELD OF THE INVENTION

The field of the invention relates in general to aerodynamic air foils, such as wind turbine rotor blades, and more particularly to an integrated lightning protection and noise reducer system for incorporation in a wind turbine blade.

BACKGROUND OF THE INVENTION

Wind power is considered one of the cleanest, most environmentally friendly energy sources presently available, and wind turbines have gained increased attention in this regard. A modern wind turbine typically includes a tower, generator, gearbox, nacelle, and one or more rotor blades. The rotor blades capture kinetic energy of wind using known foil principles. The rotor blades transmit the kinetic energy in the form of rotational energy so as to turn a shaft coupling the rotor blades to a gearbox, or if a gearbox is not used, directly to the generator. The generator then converts the mechanical energy to electrical energy that may be deployed to a utility grid.

Wind turbines, and the blades in particular, are prone to lightning strikes. Current lighting protection systems typically include a main, internal down conductor configured in the blade and connected to the wind turbine's ground path. Several individual lightning receptors (generally less than 50 mm in diameter) are located on the external surface of the blade (pressure or suction side surfaces) and are connected by a wire or cable to the down conductor. With this design, however, the "protected" area of the blade (receptor area) is relatively small compared to the overall area of the blade, leaving much of the blade prone to ungrounded lightning strikes. In addition, a lightning strike on a receptor may result in substantial damage to the primary blade structure surrounding the receptor, which involves a significant repair procedure requiring shut down of the wind turbine for removal, repair, or replacement of the blade.

Thus, an improved lightning strike protection system for wind turbine rotor blades would be beneficial, particularly a system that offers increased surface area coverage without contributing significantly to the overall weight and complexity of the blade and while facilitating relatively low cost and easier repair procedures after an actual lightning strike on the blade.

BRIEF DESCRIPTION OF THE INVENTION

Aspects and advantages of the invention will be set forth in part in the following description, or may be obvious from the description, or may be learned through practice of the invention.

In accordance with aspects of the invention, a rotor blade assembly for a wind turbine is provided and includes a rotor blade having a pressure side member, a suction side member, a leading edge, and a trailing edge extending between a tip and a root of the blade. An electrically conductive band extends longitudinally on either or both of said pressure side member and said suction side member along the trailing edge. This band may extend from the tip to the root of the blade (including along the blade in any parallel orientation to the trailing edge) in certain embodiments, or may extend at least fifty-percent of the longitudinal length of the trailing edge in other embodiments, or less than fifty-percent of the longitudinal length of the trailing edge in other embodiments. The band may be continuous or discontinuous. A plurality of noise reduction features extending from the trailing edge and are electrically conductive and configured as individual lightning strike receptors. The noise reduction features are configured in conductive communication with the conductive band.

The conductive band may be variously configured. For example, in one embodiment, the band is a conductive material that wraps around the trailing edge of the blade and onto the pressure and suction side members in sleeve-like configuration. This conductive material may be, for example, a conductive metal (e.g., copper) mesh or foil material that is formed around the trailing edge. In a particular embodiment, the pressure and suction side members are laminate shell members and the metal foil or mesh material is embedded in the layers of the shell members. In another embodiment the metal mesh material may be bonded to the external or internal surfaces of the shell members.

The noise reduction features may be variously configured as any manner of suitable projection that extends from the trailing edge of the blade. In a particular embodiment, the noise reduction features are generally V-shaped or U-shaped serrations, with each of the serrations being in conductive communication with the conductive band. For example, in one embodiment, the serrations are independently electrically connected to the conductive band via a wire, cable, or other conductive path. In another embodiment, a plurality of the serrations are electrically connected to a common bus conductor, which may be a conductive strip member, or the like. The common bus conductor is, in turn, electrically connected to the conductive band. A plurality of these strip members and associated serrations may be aligned along the trailing edge of the blade.

The serrations may be rendered electrically conductive in various ways. In one embodiment, the serrations may be formed from an electrically conductive material, such as a metal or metal composite, a conductive polymer, and so forth. In another embodiment, the serrations may be formed from a non-conductive base member and include a conductive member (e.g., a wire, mesh, foil or other metal conductor) embedded in or attached to the base member.

Alternate embodiments of a rotor blade assembly may include a plurality of non-grounded conductive areas defined on either or both of the pressure side member and suction side member of the blade in order to control electric field distribution along the blade, if required. These non-grounded conductive areas have a boundary (e.g., an edge) that is spaced from the conductive band at a distance so that during increased electrical field activity around the blade, air in the space between the conductive band and the non-grounded conductive area is ionized. This phenomenon increases the probability that a lighting strike will attach to on one or more of the conductive noise reduction features electrically coupled to the conductive band as compared to other regions of the blade. In a particular embodiment, the non-grounded conductive areas are defined as stripes that extend transversely around the leading edge ends that are spaced from the conductive band on the pressure and suction side members.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a perspective view of an embodiment of a conventional wind turbine;

FIG. 2 is a perspective view of one embodiment of a rotor blade assembly in accordance with aspects of the present invention;

FIG. 3 is a cross-sectional view along the trailing edge of one embodiment of a rotor blade assembly of the present disclosure;

FIG. 4 is a cross-sectional view along the trailing edge of another embodiment of a rotor blade assembly of the present disclosure;

FIG. 5 is a cross-sectional view along the trailing edge of still another embodiment of a rotor blade assembly of the present disclosure;

FIGS. 6(a)-6(c) are respective top views of various embodiments of noise reduction features configured with a conductive band on the pressure or suction side member of a rotor blade assembly of the present disclosure; and, FIG. 7 is a perspective view of an alternative embodiment of a wind turbine blade assembly in accordance with aspects of the invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

FIG. 1 illustrates a wind turbine 10 of conventional construction. The wind turbine 10 includes a tower 12 with a nacelle 14 mounted thereon. A plurality of rotor blades 16 are mounted to a rotor hub 18, which is in turn connected to a main flange that turns a main rotor shaft. The wind turbine power generation and control components are housed within the nacelle 14. The view of FIG. 1 is provided for illustrative purposes only to place the present invention in an exemplary field of use. It should be appreciated that the invention is not limited to any particular type of wind turbine configuration.

Referring to FIG. 2, an embodiment of a rotor blade assembly 100 in accordance with aspects of the invention includes a blade 16 defined by a pressure side member 22 and a suction side member 24 extending transversely between a leading edge 26 and a trailing edge 28. The rotor blade 16 may extend from a blade tip 32 to a blade root 34. As is well-known in the art, the pressure and suction side members 22, 24 may be laminated shell members that are joined at the leading edge 26 and trailing edge 28.

In certain embodiments, the rotor blade 16 may include a plurality of individual blade segments aligned in an end-to-end order from the blade tip 32 to the blade root 34. Each of the individual blade segments may be uniquely configured so that the plurality of blade segments define a complete rotor blade 16 having a designed aerodynamic profile, length, and other desired characteristics. For example, each of the blade segments may have an aerodynamic profile that corresponds to the aerodynamic profile of adjacent blade segments. Thus, the aerodynamic profiles of the blade segments may form a continuous aerodynamic profile of the rotor blade 16. Alternatively, the rotor blade 16 may be formed as a singular, unitary blade having the designed aerodynamic profile, length, and other desired characteristics.

The rotor blade 16 may, in exemplary embodiments, be curved. Curving of the rotor blade 16 may entail bending the rotor blade 16 in a generally flap-wise direction and/or in a generally edgewise direction. The flap-wise direction may generally be construed as the direction (or the opposite direction) in which the aerodynamic lift acts on the rotor blade 16. The edgewise direction is generally perpendicular to the flap-wise direction. Flap-wise curvature of the rotor blade 16 is also known as pre-bend, while edgewise curvature is also known as sweep. Thus, a curved rotor blade 16 may be pre-bent and/or swept. Curving may enable the rotor blade 16 to better withstand flap-wise and edgewise loads during operation of the wind turbine 10, and may further provide clearance for the rotor blade 16 from the tower 12 during operation of the wind turbine 10.

Referring to FIG. 2, an embodiment of a rotor blade assembly 100 is depicted. An electrically conductive band 102 extends longitudinally along the trailing edge 28 of the blade 16. The band 102 may extend along only one of the pressure side member 22 or suction side member 24, or wrap around the trailing edge 28 and extend on both of the members 22, 24. The band 102 may extend partially or fully along the trailing edge 28. In the illustrated embodiment, the band 102 extends essentially the full length of the blade 16 from the root 34 to the tip 32. In other embodiments, the band 102 may extend along at least fifty-percent of the trailing edge 28. In still other embodiments, the band 102 may extend less than fifty-percent of the length of the trailing edge. The band 102 may be integrated, laminated, or externally glued into the trailing edge 28.

The band 102 may be formed from various conductive materials. In the illustrated embodiment, the band 102 is formed from a pliable conductive material, such as a wire mesh 104, which may be a copper mesh, foil, or cloth material. The mesh material 104 may be wrapped around the trailing edge 28 so as to extend in a sleeve-like manner onto the suction side member 24 and the pressure side member 22. Other conductive materials, such as foils, tapes, cloths, conductive paints, and the like, may be used as the conductive band 102, and the invention is not limited to any particular type of conductive material.

The band 102 is "connected" to the wind turbine's ground system by any suitable method to conduct a lighting strike to the ground system. This connection may be, for example, a galvanic connection, hard-wired connection, and so forth. Thus, the term "connected" is used herein to encompass all such means for conducting the lightning strike from the band 102 to the ground system. For example, a simple wire or cable may be used to attach the end of the band 102 adjacent to the root 34 to the any ground path component in the hub 18, nacelle 14, and so forth. The band 102 may be continuous along the trailing edge 28, as depicted in FIG. 2, wherein only a single connection is needed to the wind turbine's ground system. In alternate embodiments, the band 102 may be discontinuous along the trailing edge, which each section of the band 102 connected to the turbine's ground system.

A plurality of noise reduction features 112 are configured along the trailing edge. The use of such devices 112 is known in the art for reducing aerodynamic noise generated by the blades 16 and increasing the efficiency of blades, and need not be described in detail herein. It should be understood that the noise reduction features 112 according to the present disclosure may have any suitable characteristics, such as widths, lengths, shapes, or orientations, depending on the desired noise reduction characteristics. Further, individual noise reduction features 112 may have individual characteristics, or various groups of noise reduction features 112 may have similar characteristics, or all noise reduction features 112 may have similar characteristics, depending on the desired noise reduction characteristics for the features. In the illustrated embodiments, the noise reduction features 112 are depicted as generally V-shaped or U-shaped serrations 114. This is for illustrative purposes only and it should be understood that any other suitable configuration of noise reduction features 112 is within the scope and spirit of the invention.

The noise reduction features 112, particularly the serrations 114, are electrically conductive and are configured in conductive communication and/or galvanic connection with the conductive band 102. With this configuration, the noise reduction features 112, particularly the individual serrations 114, serve the dual function of individual lightning strike receptors along the trailing edge 28. For example, referring to FIG. 2, each of the individual serrations 114 may be considered or regarded as a lightning strike receptor, and a strike on any one of the serrations 114 along the trailing edge 28 is conducted to the band 102 and the turbine's ground system.

The conductive band 102 may be variously configured on the pressure and suction side members 22, 24. For example, referring to the embodiment depicted in FIG. 3, each of the pressure and suction side members 22, 24 may be multi-layer laminate shell members that are joined at the leading 26 and trailing 28 edges, as is known in the art. The conductive band 102, for example a copper wire mesh material 104, may be embedded in the shell members during manufacture of the shell members. Even if a lightning strike causes damage to the serrations 114 and band 102 (or shell member), it is a relatively easy repair process to cut out and replace the damaged section of the shell (and embedded band 102) and attach new serrations 114 (or sections of the noise reduction features 112). In alternate embodiments, the conductive band 102 may be attached by any suitable means to an external or internal surface of the shell members.

FIGS. 6a, 6b, and 6c depict various exemplary embodiments of noise reduction features 112 having distinct serrations 114. In FIG. 6a, the noise reduction feature 112 includes a plurality of serrations 114 that extend from a base strip member 118, which is conductively attached (e.g., galvanically connected) to the band 102. The strip member 118 and serrations 114 are formed as an integral component from a conductive material, such as a metal, metal alloy, a plastic or other non-conductive material having a conductive material, such as a wire mesh, embedded therein, or any other suitable conductive material that also functions as an effective noise reduction material.

In the embodiment of FIGS. 6b and 6c, the strip member 118 and serrations 114 are formed from a con-conductive base material 124. Conductive members 122 of any suitable size, shape, and configuration are embedded or otherwise attached to the base material 124 along each serration 114 and are connected to one or several common bus conductors 106 that are embedded or otherwise attached along the strip member 118. The bus conductors 106 are, in turn, connected to the conductive band 102 by suitable bus conductors 120 that can withstand the electrical and thermal effects of a lighting strike.

In the embodiment of FIG. 6c, the conductive members are embedded in the base material 124 and are individually connected to the conductive band 102.

It should be appreciated that, in other embodiments, the serrations 114 may be individually defined and separately attached to the conductive band 102 without an intermediate strip member 118.

The noise reduction features 112 may be connected to the conductive band in various ways. For example, in the embodiment of FIG. 3, the strip member 118 is mechanically fastened to the suction side member 24 over the conductive band 102 with mechanical fasteners 126, such as bolts, rivets, screws, and the like. It should be appreciated that the same configuration may be provided on the pressure side member 22.

In another embodiment, the noise reduction features 112 may be bonded or otherwise adhered to a respective suction or pressure side member 22, 24, as depicted in FIG. 4 wherein the strip member 118 portion of the noise reduction features 112 is bonded to the conductive band 102 with bond paste 128 (without electrically isolating the strip member from the conductive band).

FIG. 5 depicts an embodiment wherein the conductive band 102 is provided as a longitudinally extending band along the trailing edge of the suction side member 24 without wrapping onto the pressure side member 22. In other words, the band is applied on only one of the pressure or suction side members 22, 24 along the trailing edge 28. The strip member 118 of the noise reduction features 112 is sandwiched between the suction side member 24 and the conductive band 102, and may be secured with any manner of suitable mechanical fastener. Alternatively, the conductive band 102 and strip member 118 may be laminated or infused with the layers of the suction side member 24 during formation of the member 24.

With the configuration of the noise reduction features 112 as a strip member 118 with a plurality of serrations 114 extending therefrom, the features may be manufactured in strip form and attached along the entire trailing edge 28 of the blade 16, or any other desired length of the edge 28. In an alternate embodiment depicted in FIGS. 2 and 7, the noise reduction features 112 are formed as discrete sections 116 that are aligned along the trailing edge 28.

FIG. 7 is an embodiment of a rotor blade assembly 100 that incorporates a plurality of non-grounded conductive areas 130 defined on either or both of the pressure side member 22 and suction side member 24 of the blade 16. The non-grounded conductive areas 130 have a boundary, such as edges or ends 132 (suction side end) and 134 (pressure side end) that is spaced at a defined distance from the grounded conductive band 102. The areas 130 may be defined in any pattern, shape, or configuration on the blade surfaces. In the illustrated embodiment, the areas are defined as stripes 136 that wrap around the leading edge 26 of the blade and extend along the pressure and suction side members 22, 24 with ends 134, 132 that are spaced from the conductive band 102 a distance of less than ten (10) centimeters in particular embodiments. This distance may vary between blade types, shapes, configurations, and so forth, but is defined so that during increased electrical field activity around the blade 16, air in the region between the conductive band 102 and the non-grounded conductive areas 130 is ionized. This effect increases the probability of a lighting strike on one or more of the conductive noise reduction features 112 as compared to other regions of the blade 16. This is beneficial in that repairs of the trailing edge materials (conductive band 102, noise reduction features 112, shell laminate sections) can be done relatively quickly and at less expense as compared to replacement of entire sections of the pressure or suction side members. The stripes 136 are optional features of the blades and, even if provided, may be decoupled if desired.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade assembly for a wind turbine, comprising:
   a rotor blade having a pressure side member, a suction side member, a leading edge, and a trailing edge extending between a tip and a root;
   an electrically conductive band comprising a conductive material that wraps around said trailing edge onto an external surface of either or both of said pressure side member and said suction side member of said blade, said conductive material embedded within either on or both of said pressure side member and said suction side member;
   a plurality of noise reduction features coupled to said conductive band so as to extend said trailing edge, said noise reduction features being electrically conductive and configured as individual lightning strike receptors; and, said noise reduction features configured in electrically conductive communication with said conductive band.

2. The rotor blade assembly as in claim 1, wherein said pressure side member and said suction side member comprise laminate shell members, wherein said conductive material is embedded in said shell members.

3. The rotor blade assembly as in claim 1, wherein said conductive band extends at least fifty-percent of the length of said trailing edge.

4. The rotor blade assembly as in claim 1, wherein said noise reduction features comprise serrations, each said serration being in conductive communication with said conductive band.

5. The rotor blade assembly as in claim 4, wherein said serrations are independently electrically connected to said conductive band.

6. The rotor blade assembly as in claim 4, wherein a plurality of said serrations are connected to one or more common bus conductors, said common bus conductors connected to said conductive band.

7. The rotor blade assembly as in claim 4, wherein said serrations are formed from an electrically conductive material.

8. The rotor blade assembly as in claim 4, wherein said serrations comprise a conductive member configured with a nonconductive base material.

9. The rotor blade assembly as in claim 8, wherein said conductive member is embedded in said base material.

10. The rotor blade assembly as in claim 8, wherein said conductive member is externally configured on said base material.

11. The rotor blade assembly as in claim 1, wherein said noise reduction features comprise a plurality of individual serrations that extend from a strip member, said strip member mounted in electrical or galvanic communication with said conductive band.

12. The rotor blade assembly as in claim 11, wherein said strip member is externally mounted to said conductive band.

13. The rotor blade assembly as in claim 11, wherein said pressure side member and said suction side member comprise laminate shell members, said strip member mounted between said conductive band and said pressure side or said suction side shell member along said trailing edge.

14. The rotor blade assembly as in claim 11, comprising a plurality of said strip members and associated said serrations extending along said trailing edge.

15. The rotor blade assembly as in claim 1, further comprising a plurality of non-grounded conductive areas defined on either or both of said pressure side member and said suction side member of said blade, said non-grounded conductive areas having a boundary that is spaced from said conductive band a distance so that during increased electrical field activity around said blade, air between said conductive band and said non-grounded conductive area is ionized, thereby increasing the probability of a lighting strike on one or more of said conductive noise reduction features as compared to other regions of said blade.

16. The rotor blade assembly as in claim 15, wherein said conductive band comprises a conductive material that wraps around said leading edge of said blade onto said pressure side member and said suction side member of said blade, said non-grounded conductive areas defined as stripes that extend transversely around said leading edge with a suction side end and a pressure side end spaced from said conductive band.

17. A rotor blade assembly for a wind turbine, comprising:
   a rotor blade having a pressure side member, a suction side member, a leading edge, and a trailing edge extending between a tip and a root, said pressure side member and said suction side member comprise laminate shell members;
   an electrically conductive band that wraps around said trailing edge onto said pressure side member and said suction side member of said blade, said conductive band comprising a conductive material that is embedded in said shell members;
   a plurality of noise reduction features extending from said trailing edge, said noise reduction features being electrically conductive and configured as individual lightning strike receptors;
   said noise reduction features configured in electrically conductive communication with said conductive band; and
   a plurality of non-grounded conductive areas defined on either or both of said pressure side member and said suction side member of said blade, said non-grounded conductive areas having a boundary that is spaced from said conductive band a distance so that during increased electrical field activity around said blade, air between said conductive band and said non grounded conductive area is ionized, thereby increasing the probability of a lighting strike on one or more of said conductive noise reduction features as compared to other regions of said blade.

* * * * *